United States Patent [19]

Siamon

[11] Patent Number: 4,828,621
[45] Date of Patent: May 9, 1989

[54] COMPOSITION AND METHOD FOR ANTI-STATIC PROTECTION

[76] Inventor: Al Siamon, 3860 Higuera, D-16, San Luis Obispo, Calif. 93401

[21] Appl. No.: 918,523

[22] Filed: Oct. 14, 1986

[51] Int. Cl.[4] ............................................. C08J 3/02
[52] U.S. Cl. ................................. 106/271; 106/270; 524/911; 524/914; 524/912
[58] Field of Search .............. 106/271, 272, 270, 10, 106/11; 427/385.5; 524/912, 417, 911, 914; 260/DIG. 15, DIG. 16

[56]  References Cited
U.S. PATENT DOCUMENTS

| | | | |
|---|---|---|---|
| 3,884,711 | 5/1975 | Varsanyi et al. | 106/271 |
| 4,064,067 | 12/1977 | Lore | 106/271 |
| 4,082,558 | 4/1978 | Nobuo | 106/271 |

Primary Examiner—Josephine Barr
Attorney, Agent, or Firm—Louis J. Bachand

[57]  ABSTRACT

Composition and method for protecting extended planar surfaces from undue-build-up of static charge comprising an aqueous solution of e.g. sodium tripolyphosphate buffered with a mixture of baking soda and washing said against aggressive corrosion of the treated surface by the polyphosphate, applied per se or in intimate mixture with conventional surface protective films such as waxes and paints.

12 Claims, No Drawings

COMPOSITION AND METHOD FOR ANTI-STATIC PROTECTION

TECHNICAL FIELD

This invention has to do with compositions and methods for the protection of surfaces from build-up of electrostatic force, and is more particularly concerned with compositions useful per se and as a component of known surface treating systems, including water based paints and waxes, for reduction in tendency of the surface to accumulate charge.

BACKGROUND OF THE INVENTION

In myriad situations in home and industrial life extended planar surfaces ranging from television screens to flooring are subject to accumulation of static charge. The disadvantages of such accumulation include sudden, unwanted discharges which can glitch computers, and cumulative deposit of dirt particles onto the surface as a dingy grime.

SUMMARY OF THE INVENTION

Sodium tripolyphosphate is effective as a destaticizer for surfaces ranging from metal and glass to plastics such as vinyl. Sodium tripolyphosphate, however, is an extremely aggressive chemical which can irremediably damage the surface being treated, or even nearby surfaces to which the chemical is carried by the air. Sodium tripolyphosphate is not a useful additive for wax or paint systems either and for the same reason of overagressiveness. Accordingly, the invention provides a buffering system which while retaining the benefits of the tripolyphosphate, limits its aggressiveness against surfaces being treated and enhances the destaticizing effect. In addition, the buffering system is film-forming and adheres to the treated surface, prolonging the anti-static condition of the treated surface.

In its particular aspects, the invention provides a composition for protection from build-up of electro-static charge of extended plane surfaces normally subject to such build-up in their use environment, the composition comprising an aqueous solution for application to the surface of a water soluble tripolyphosphate, and per 3 to 5 parts by volume of the tripolyphosphate from 2 to 3 parts by volume of a buffer system comprising washing soda and baking soda in film-forming amounts co-dissolved in the aqueous solution.

Typically, the tripolyphosphate is an alkali metal tripolyphosphate, such as and particularly sodium tripolyphosphate, and is present generally in an amount of 3 to 5 tablespoons per gallon of water.

Similarly, the tripolyphosphate is typically present in an amount of about 4 tablespoons per gallon of water, with the baking soda correspondingly being present in an amount of about 1 tablespoon per 4 tablespoons of tripolyphosphate, and the washing soda being present in an amount of about 2 tablespoons per 4 tablespoons of tripolyphosphate.

Generally a solids concentration of about 4 to about 16% by volume is preferred in the anti-static composition.

In another embodiment, there is provided the foregoing composition, in intimate mixture with a hydrocarbon-based film-forming, surface coating material, in effective amount to reduce static charge build-up in the coating material in the applied condition on an extended planar surface, wherein the material is a floor waxing material such as an emulsion of a waxy polymer, e.g. of acrylic acid based monomers, or paint emulsions of organic polymers.

The invention further contemplates the method of reducing the tendency of an extended planar surface to hold electrostatic charge including applying to the surface and letting dry in situ an aqueous composition comprising an aqueous solution of a water soluble tripolyphosphate, and per 3 to 5 parts by volume of the tripolyphosphate from 2 to 3 parts by volume of a buffer system comprising washing soda and baking soda in film-forming amount co-dissolved in the aqueous solution.

PREFERRED MODES

The present composition is prepared by dissolving in the indicated quantity of water, prewarmed if desired from tap ambient, the several powdered ingredients and mixing throroughly. Methods of application are not narrowly critical, with wiping, brushing, sponging, daubing and spraying being suitable modes of application. The composition is then let dry under ambient conditions. A film forms which is tenacious and must be washed off. Treatment of computer monitor screens does not affect visibility of the screen characters but does prevent dust accumulation and dinginess on the screen for periods in excess of one year.

In another application, the composition is mixed at from 1 to 25% by volume with commercial acrylic floor wax and the mixture applied. Readings on the charge level of the vinyl flooring to which the mixture is applied and let dry are on the order of one to 20% per cent of the floor waxed with the same wax but without addition of the invention additive composition. Similar results are obtained with water based paints, e.g. vinyl or acrylic latex paints. The desirable reduction in static charge is not realized when merely sodium tripolyphosphate is added at up to levels which do not demulsify the water emulsion.

Washing soda, sometimes referred to as sal soda, is a commercially available, whitish powder of water soluble, alcohol insoluble crystals of sodium carboate decahydrate. Baking soda is sodium bicarbonate, a white, crystalline product which is commercially available. The preferred tripolyphosphate herein is sodium tripolyphosphate, a white powder melting at 622° C. Other water soluble tripolyphosphates can be used herein particularly those of alkali metals, e.g. potassium and lithium.

As indicated above, the relative proportions of the several ingredients are such that the aggressive chemical nature of the tripolyphosphate is muted by the use of the buffer composition described. In addition, the composition is rendered film-forming thereby for permanence of application. The foregoing proportions should not be varied substantially because of a diminishing of the anti-static effect or undue corrosive, oxidative, chemical activity by the tripolyphosphate in such cases.

EXAMPLE

To one gallon of deionized water was added 4 to 16 ounces of solids in the ratio of 4 parts by volume sodium tripolyphosphate, one part by volume baking soda and one part by volume washing soda. A trace of tan color is added to facilitate monitoring application and permanence of deposit. The solution, after stirring to dissolve the solids, is applied to a vinyl tile laboratory floor with a standard floor waxing sponge. A portion of the floor is left untreated. After drying, the film of anti-static material is tough and flexible, self-lubricous, and lends a bright appearance to the floor. After a one week period of use by laboratory personnel, the amount of residual charge on the floor is measured and found to be 14% of the level on the untreated portion of the floor. After a further period of time, the accumulation of dust and dirt on the floor portions is compared and the treated portion is found to exhibit a cleaner appearance. Monitoring the tan color tracer reveals that the composition coating resists wearing off from foot traffic.

In another application, a commercial acrylic floor wax is blended with 20% by weight of the invention composition prepared above but without the color tracer, and applied normally. Equivalent results are obtained in terms of anti-static improvement, and dirt resistance, and a fresh layer of wax is added to the floor. Similar results are observed in a water-base acrylic paint which apart from the addition of 5% of the Example 1 composition was just as sold by the manufacturer.

I claim:

1. Composition for protection from build-up of electrostatic charge of extended plane surfaces normally subject to such build-up in their use environment, said composition consisting essentially of an aqueous solution for application to said surface of a water soluble tripolyphosphate, and per 3 to 5 parts by volume of said tripolyphosphate from 2 to 3 parts by volume of a buffer system comprising washing soda and baking soda in film-forming amount co-dissolved in said aqueous solution.

2. Composition according to claim 1, in which said tripolyphosphate is an alkali metal tripolyphosphate.

3. Composition according to claim 2, in which said tripolyphosphate is sodium tripolyphosphate.

4. Composition according to claim 1, in which said tripolyphosphate is present in an amount of 3 to 5 tablespoons per gallon of water.

5. Composition according to claim 4, in which said tripolyphosphate is present in an amount of about 4 tablespoons per gallon of water.

6. Composition according to claim 5, in which said baking soda is present in an amount of about 1 tablespoon per 4 tablespoons of tripolyphosphate.

7. Composition according to claim 5, in which said washing soda is present in an amount of about 2 tablespoons per 4 tablespoons of tripolyphosphate.

8. Composition according to claim 6, in which said washing soda is present in an amount of about 2 tablespoons per 4 tablespoons of tripolyphosphate.

9. Composition according to claim 7, in which said baking soda is present in an amount of about 1 tablespoon per 4 tablespoons of tripolyphosphate.

10. Composition of claim 1, in intimate mixture with a hydrocarbon-based film-forming, wax or water-based paint surface coating material in effective amount to reduce static charge build-up in said coating material in the applied condition on an extended planar surface.

11. The composition mixture according to claim 10, in which said hydrocarbon-based material is a floor waxing material.

12. The composition according to claim 10, in which said hydrocarbon-based material is a water based paint.

* * * * *